United States Patent
Chen et al.

(10) Patent No.: US 6,950,224 B1
(45) Date of Patent: Sep. 27, 2005

(54) ELECTROSTATIC MOVABLE MICRO MIRROR CHIP

(75) Inventors: Bing-Ru Chen, Hsinchu (TW); Wu-Cheng Kuo, Hsinchu (TW); Ming-Hung Chen, Hsinchu (TW); Jui-Ping Weng, Hsinchu (TW); Yeh-I Su, Hsinchu (TW); Hsiao-Wen Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/922,265

(22) Filed: Aug. 18, 2004

(30) Foreign Application Priority Data

May 28, 2004 (TW) .............................. 93115315 A

(51) Int. Cl.⁷ ............................................. G02B 26/00
(52) U.S. Cl. ....................... 359/291; 359/290; 359/223
(58) Field of Search ............................... 359/222, 223, 359/224, 291, 295, 298, 225, 226, 290, 292, 359/293

(56) References Cited

U.S. PATENT DOCUMENTS

| 6,075,639 A | 6/2000 | Kino et al. |
|---|---|---|
| 6,262,827 B1 * | 7/2001 | Ueda et al. .................. 359/224 |
| 6,442,307 B1 | 8/2002 | Carr et al. |
| 6,795,225 B2 * | 9/2004 | Tsuboi et al. ............... 359/224 |
| 2001/0019445 A1 | 9/2001 | Ueda |
| 2002/0196523 A1 | 12/2002 | Ueda |
| 2003/0007262 A1 | 1/2003 | Tsuboi et al. |
| 2003/0035192 A1 | 2/2003 | Mizuno et al. |

* cited by examiner

*Primary Examiner*—Hung Xuan Dang
*Assistant Examiner*—Tuyen Tra
(74) *Attorney, Agent, or Firm*—Welsh & Katz, Ltd.

(57) ABSTRACT

An electrostatic movable micro mirror chip includes an upper mirror plate and a lower electrode plate positioned and jointed together via pairs of fitting solder and positioning grooves. It improves the optical quality of the mirror chip by a lower joining temperature. The fitting and jointing achieves easy positioning and interconnection. The fabrication time and cost is less. The mirror in the mirror chip is plated with metallic coating on both sides so as to balance the stress and improve its flatness.

16 Claims, 14 Drawing Sheets

ELECTROSTATIC MOVABLE MICRO MIRROR CHIP

FIELD OF THE INVENTION

The invention generally relates to an electrostatic movable micro mirror chip applicable to optical communication or optical display industry, and in particular relates to an electrostatic movable micro mirror chip in which solder is used for positioning and jointing.

BACKGROUND OF THE INVENTION

In the optical communication industry, requirements of optical components are getting more and more severe. The optical devices suppliers have to provide smaller while cheaper components to meet customer's requirements. By applying semiconductor manufacturing process and other machining processes, kinds of high-precision and high-quality micro mechanical elements can be made in a mass production scale.

Movable micro mirror chip is a kind of micro component applicable in optical communication or display modules. The micro mirror chip mainly includes a mirror layer and an actuation layer. The mirror layer is a suspended mirror actuated to swing or revolve by electrostatic force of the actuation layer. The micro mirror chip works as an attenuator in optical communication by steering the light beam direction. The biggest challenge in fabrication of a conventional movable micro mirror chip is the positioning alignment of the mirror layer and the actuation layer. The alignment process requires operations of hands or specific positioning machines that cause a high manufacturing cost very difficult to be reduced.

U.S. Pat. No. 6,442,307 discloses a micro mirror device, in which the mirror layer and the actuation layer are jointed together by solder joints. Though the construction solves conduction and jointing problem, the solder joint does not provide precise positioning. Therefore, a spacer is user for the positioning function. However, when the solder melts, it loses its form. In order to stabilize the jointing and to remove the spacer after soldering, special materials for the spacer is required that makes the material selection very difficult. Also, the height of the solder layers is hard to be controlled after the large temperature variation. Moreover, since the mirror layer and the actuation layer all require electrical circuit to operate, there are wire-bonding areas on the layers that are easy to be stained by re-flow solder because there is no protection manner. The melted solder may stain the bonding areas and make the afterward wire bonding impossible, or even ruin the whole chip and increase fabrication cost of the product.

SUMMARY OF THE INVENTION

The object of the invention is to provide an electrostatic movable micro mirror chip that has good performance, easy packaging, good positioning during jointing, and well protection to the signal connection area for preventing it from solder stain.

An electrostatic movable micro mirror chip according to the invention includes an upper mirror plate and a lower electrode plate. The upper mirror plate carries a mirror that is supported by a cantilever beam for swinging relative to the upper mirror plate; or supported by two arms for revolutions relative to the upper mirror plate. The lower electrode plate is formed a cavity for the mirror freely moving therein. The cavity is arranged with electrodes for actuating the mirror through electrostatic force.

There are fitting solder and positioning grooves formed correspondingly on the upper mirror plate and the lower electrode plate for positioning with each other and being melted and fixed by heat. There is a shrinking pipe or a stopping wall located between the fitting solder and the signal connection area so as to prevent the signal connection area from solder stain during soldering.

Both sides of the mirror are coated with metallic layers for good reflection, interconnection and stress-balance for preventing it from deformation. The electrostatic movable micro mirror chip of the invention utilizes fitting solder and positioning grooves for both positioning and jointing. It reduces manufacturing cost and saves time. The signal connection area is prevented from solder stain by means of a shrinking pipe or a stopping wall located between the fitting solder and the signal connection area. The mirror is both-side coated for eliminating any stress generated by construction, material and temperature process and enhancing flatness of the mirror.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 1A:
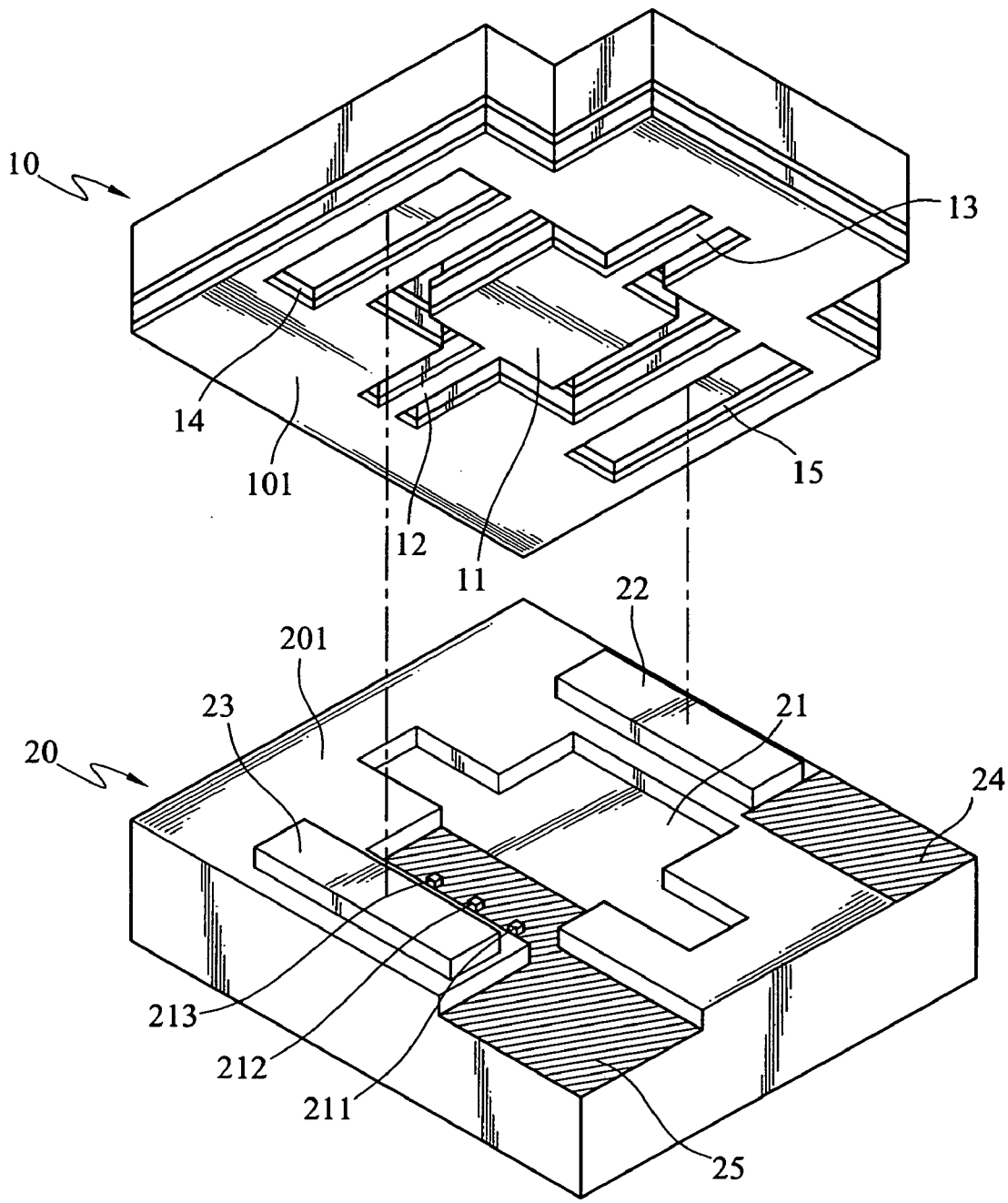
FIG. 1A is an exploded view of an electrostatic movable micro mirror chip of the invention.
Figure 1B:
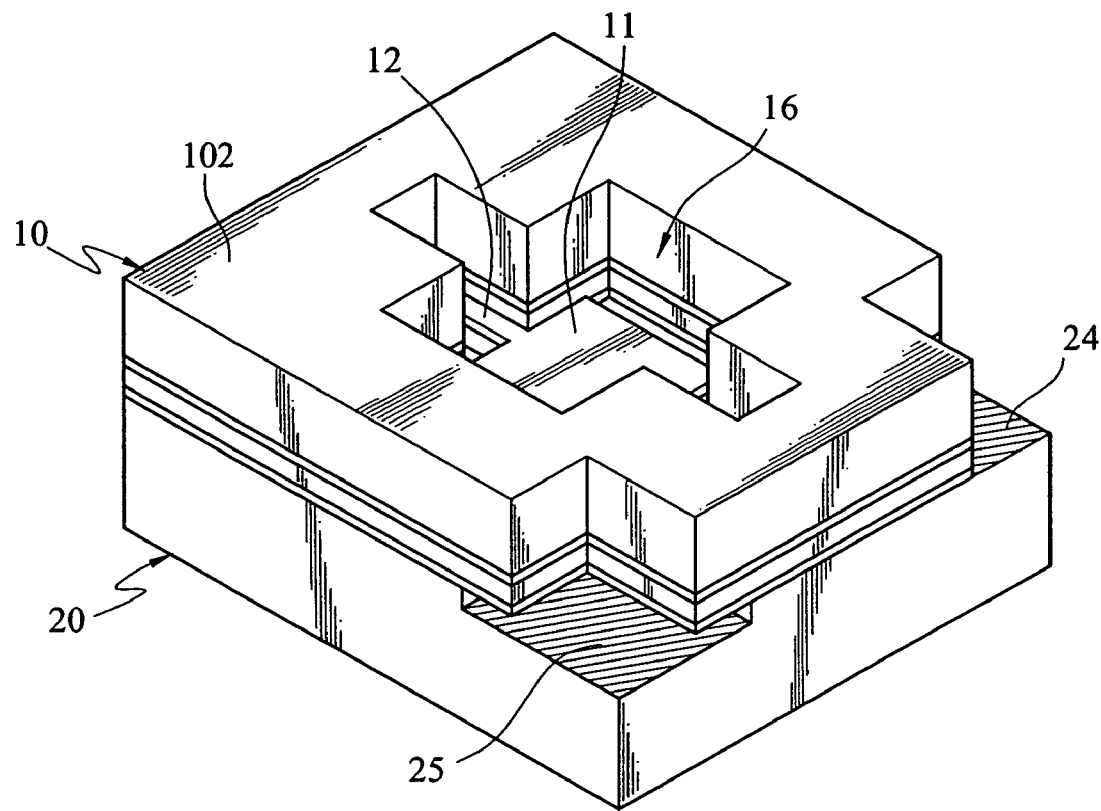
FIG. 1B is a perspective view of an electrostatic movable micro mirror chip of the invention.

As shown in FIGS. 1A and 1B, an electrostatic movable micro mirror chip according to the invention includes an upper mirror plate 10 and a lower electrode plate 20. The middle portion of the upper mirror plate 10 carries a mirror 11 that is supported by two arms 12, 13 for revolutions relative to the upper mirror plate 10. The upper mirror plate 10 has a top surface 102 and a bottom surface 101. The top surface 102 is formed with a cavity 16, 21 corresponding to the mirror 11. The mirror 11 has a reflective surface facing up. The top surface 102 is formed with two positioning grooves 14, 15 located preferably on both sides of the mirror 11.

The lower electrode plate 20 has its top surface 201 jointed with the bottom surface 101 of the upper mirror plate 10. The top surface 210, corresponding to the mirror 11, is formed with a cavity 16, 21 for the mirror 11 freely moving therein. Both sides of the cavity 16, 21, corresponding to the positioning grooves 14, 15, are formed with fitting solder 23, 22 having correspondent shapes of the positioning groove 14, 15. There is a solder seed layer at the root of the fitting solder. The solder seed layer of the fitting solder has a little bit larger area than the fitting solder. Therefore, upon soldering, the fitting solder 22, 23 are fitted into the positioning grooves 14, 15 and then heated to joint the upper mirror plate 10 and the lower electrode plate 20 together.

Figure 2A:
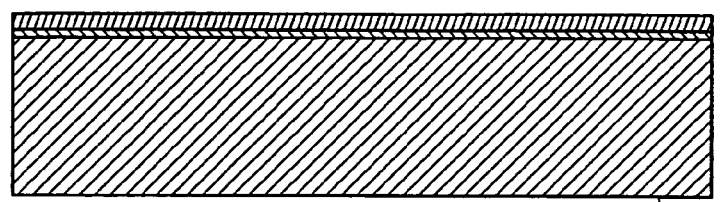
FIGS. 2A to 2F are sequential process views of making an upper mirror plate in the invention.
Figure 2B:
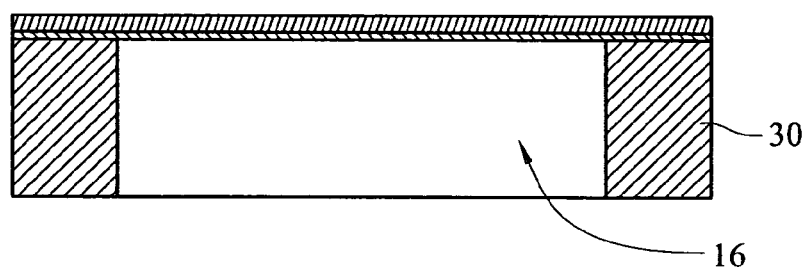
Figure 2C:
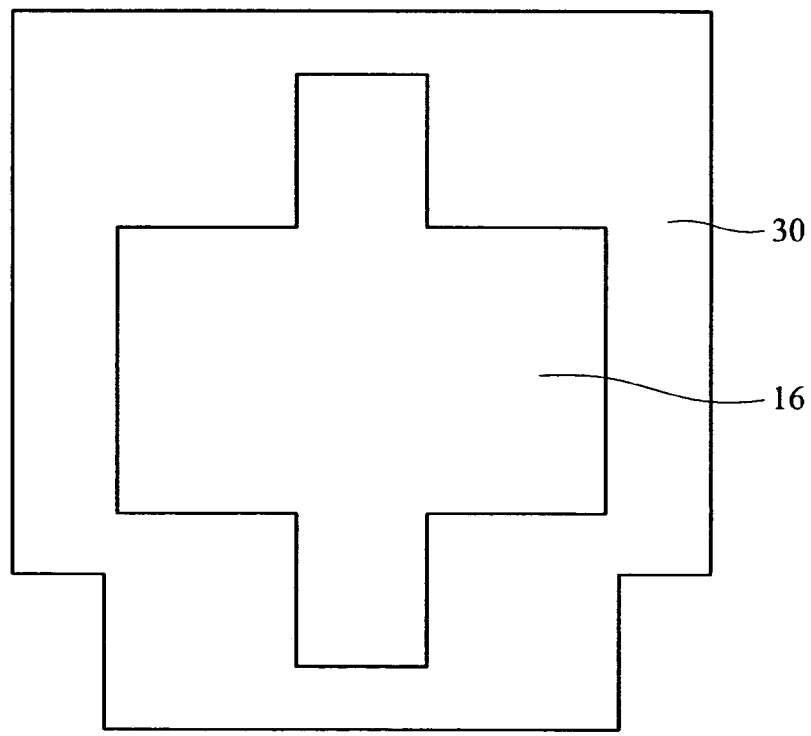
Figure 2D:
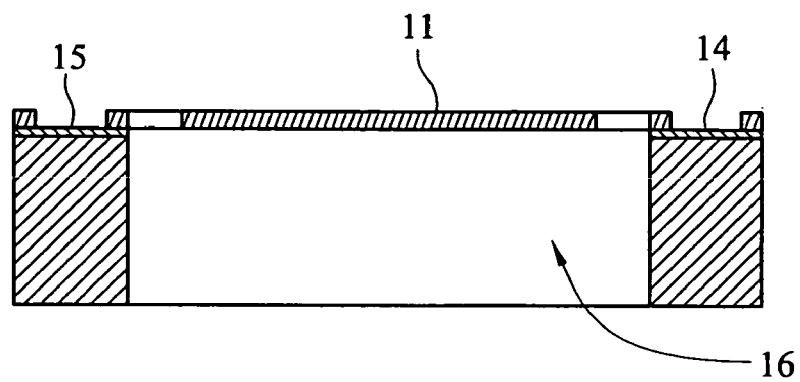
Figure 2E:
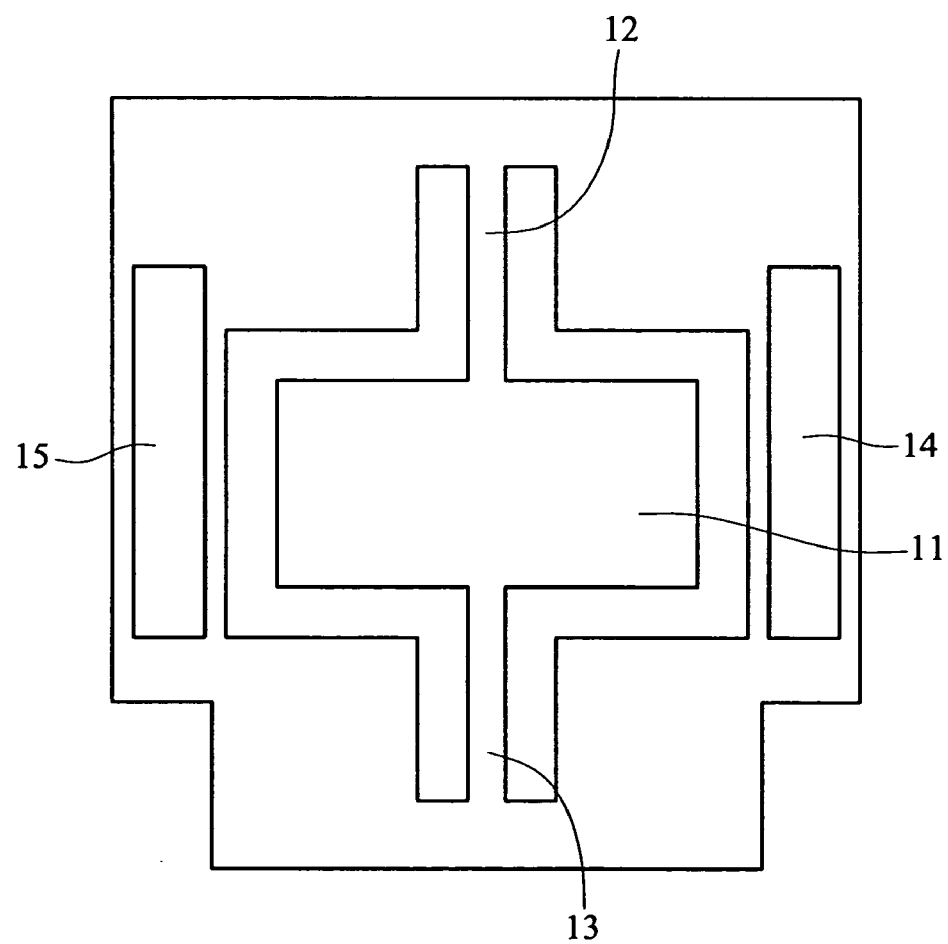
Figure 2F:
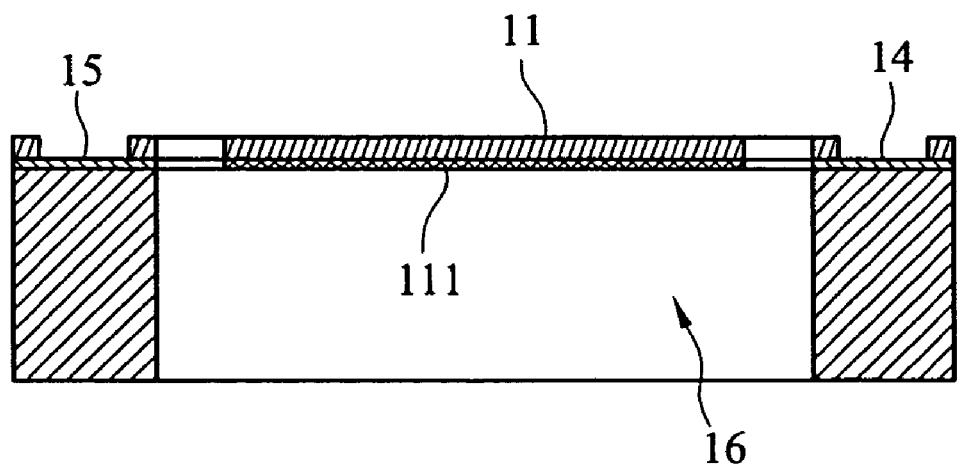

The fabrication process of the upper mirror plate 10 is as follows. First, preparing a substrate 30, as shown in FIG. 2A. The substrate 30 is usually of silicon on insulator (SOI). Then, etching to form a cavity 16 (as shown in FIGS. 2B and 2C) from the bottom and etching to form the suspended mirror 11, the arms 12, 13 and the positioning grooves 14, 15 from the top (as shown in FIGS. 2D and 2E). Finally, plate a metallic coating 111 on the mirror 11 from the bottom (as shown in FIG. 2F). The mirror 11 has a thickness less than the upper mirror plate 10.

Figure 3A:
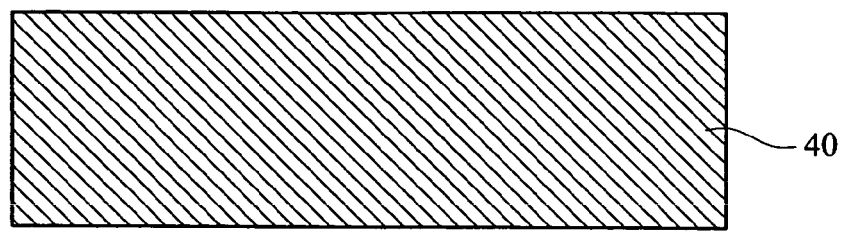
FIGS. 3A to 3E are sequential process views of making a lower electrode plate in the invention.
Figure 3B:
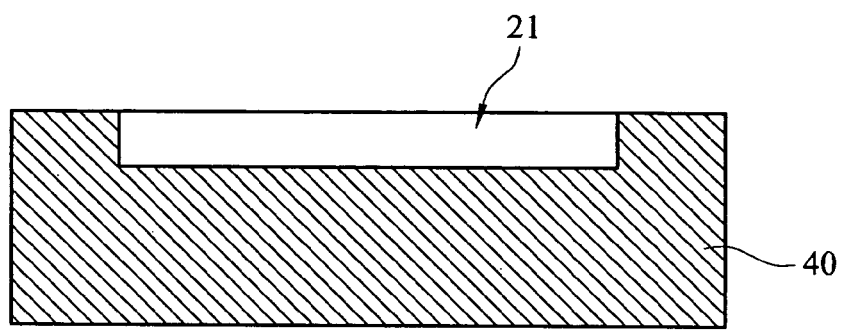
Figure 3C:
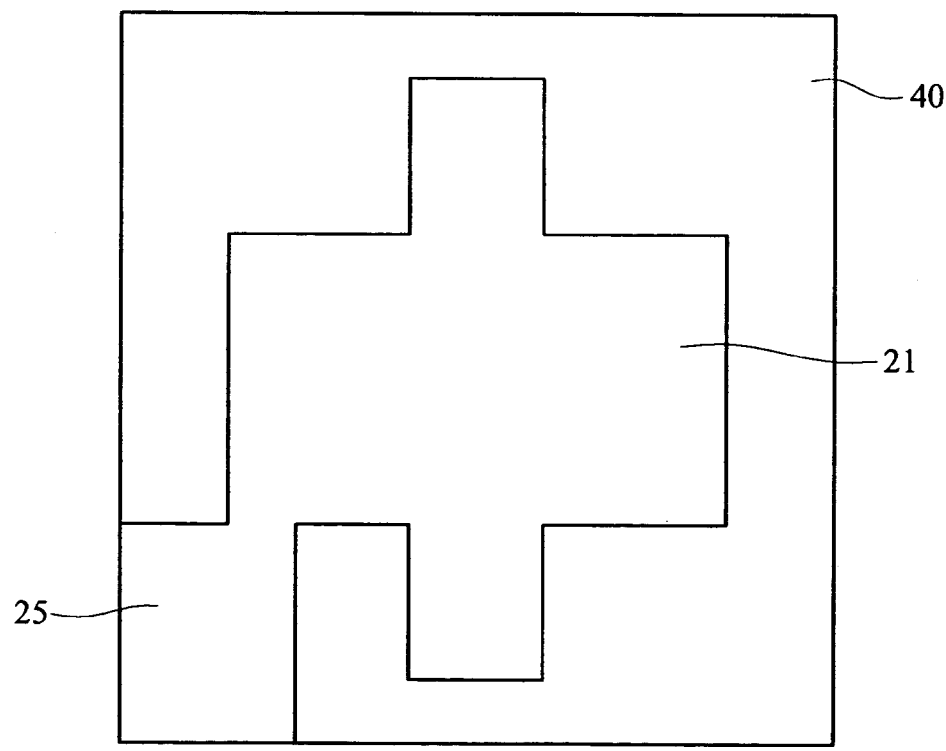
Figure 3D:
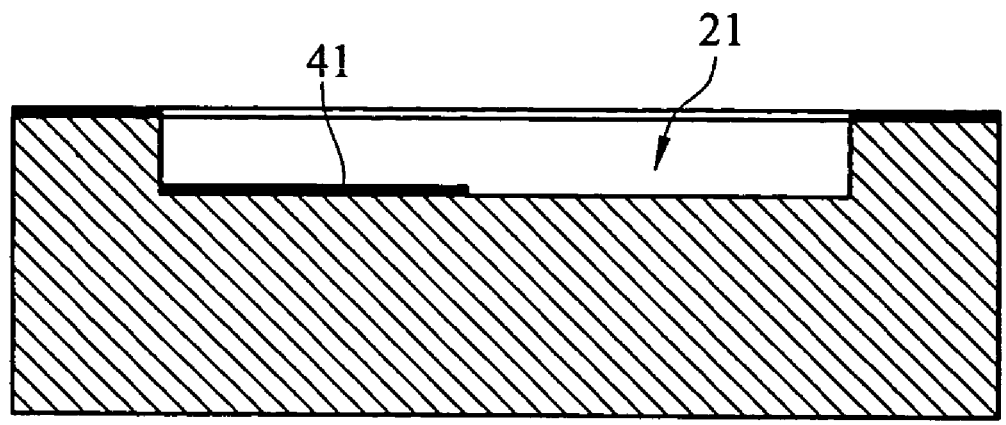
Figure 3E:
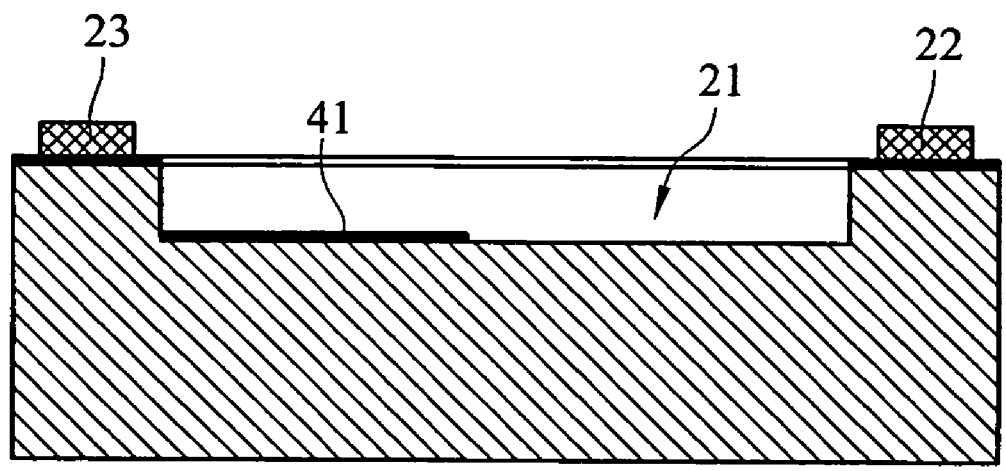

The fabrication process of the lower mirror plate 20 is as follows. First, preparing a substrate, as shown in FIG. 3A. Then, forming the groove 21 and the signal connection area 25, as shown in FIGS. 3B and 3C. The signal connection area 25 and the actuation manner will be described later. Furthermore, arranging metallic electrodes 41 (as shown in FIG. 3D) and the solder 22, 23 (as shown in FIG. 3E).

Figure 2G:
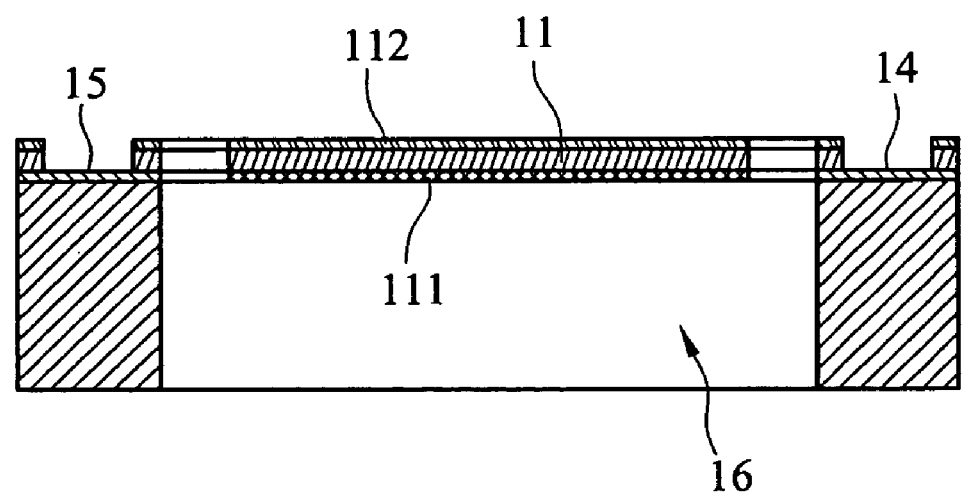
FIG. 2G is an addition process view of making an upper mirror plate in the invention.
Figure 4A:
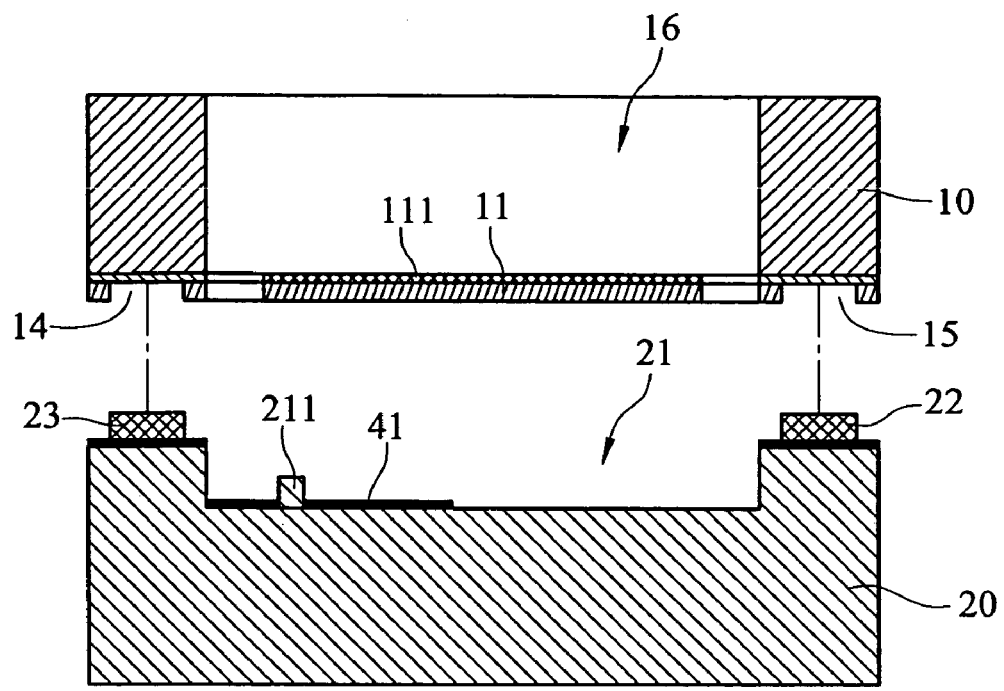
FIGS. 4A to 4C are sequential process views of jointing a mirror plate and an electrode plate in the invention.
Figure 4B:
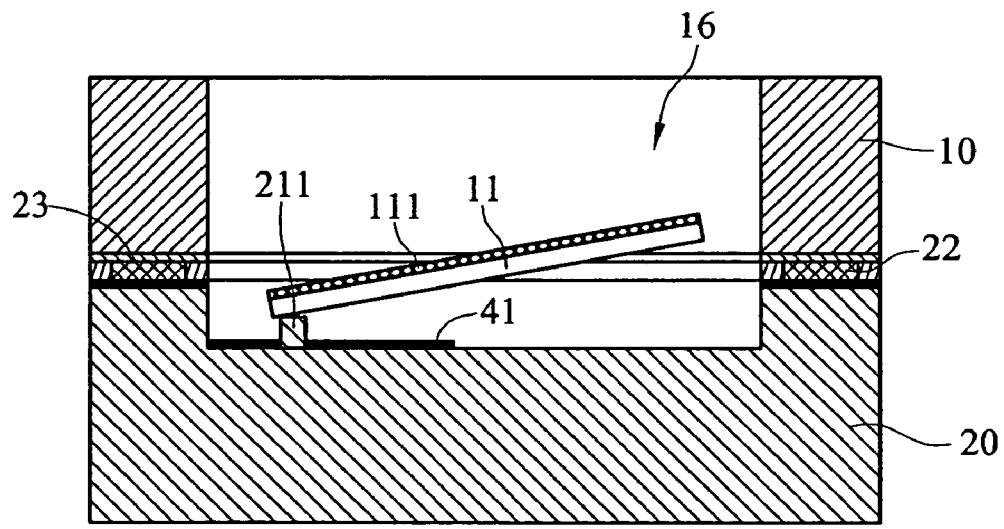
Figure 4C:
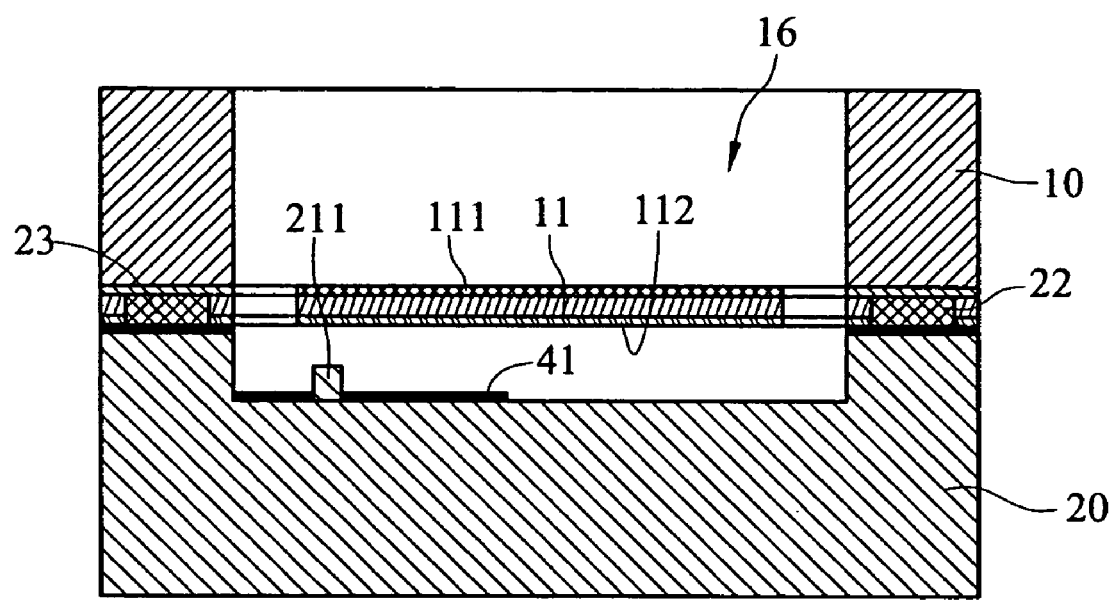

When jointing, as shown in FIG. 4A, turning over the upper mirror plate 10 to let the cavity 16 and the metallic coating 111 faces up. Then, positioning the positioning grooves 14, 15 to the fitting solder 23, 22, and heating to solder and fix them, as shown in FIG. 1B. The process simultaneously solves the problems of positioning and jointing. The actuation is achieved by applying electrical voltage to the signal connection area 25 and the cavity 21 through wire bonding (as shown in FIG. 1A). The upper mirror plate 10 is actuated by directly applying voltage to the metallic coating 111 of the mirror 11 (as shown in FIG. 4A). When the electrical voltage being applied to the mirror 11 and the cavity 21, the mirror 11 is attracted to rotate by the arms 12, 13 (as shown in FIG. 4B). However, in this arrangement, the electrode of the upper mirror plate 10 is located on top of the mirror 11, as shown in FIG. 4C. If wiring or other method is applied to the mirror 11, it is hard to process and will interfere the movement of the mirror 11. Therefore, both sides of the mirror 11 are processed with metallic coatings 111, 112, as shown in FIG. 2G. After soldering, the signal connection area 24 of the lower electrode plate 20 and the metallic coating 112 of the mirror 11 are electrically connected to actuate the chip through the signal connection area 24 and no need of wiring to the mirror 11. The both-side coating also gets an advantage of stress balance. Because the fitting solder 22, 23 require thermal welding, the chip also requires temperature variation tests; these temperature variations usually cause stress (such as bending) to the mirror 11 and influence the flatness of the mirror 11 due to the different material of the mirror substrate and the coating 111. Therefore, when coating at both sides 111, 112, not only a lower actuation voltage can operate the chip, the materials, such as gold, silver, titanium, chromium and aluminum, for both sides of the mirror is chosen with the same; or different materials while compensated by thickness, so as to keep the mirror flat. Moreover, because the upper mirror plate 10 is turned over for jointing, the metallic coating 112 of the mirror 11 is almost at the same height of the bottom surface 101 of the upper mirror plate 10. Therefore, the actuation height is decided by the depth of the cavity 21. In comparison to construction of prior arts, the depth is easier to be controlled. As for the solder material, through the invention can balance the stress, it is still preferred of using solder of lower melting temperature, such as the solder model In52/Sn48 melted at 118 centigrade degree, model In97/Ag3 at 146 centigrade degree, model In80/Pb15/Ag5 at 149 to 154 centigrade degree and so on.

Because of the both side metallic coating 111, 112 of the mirror 11, the manner of actuation can also be adjusted. As shown in FIGS. 1A and 1B, there is another signal connection area 24 formed near the fitting 22. And, when plating the metallic coating 112, the bottom surface 101 of the upper mirror plate 10 is also plated with metallic coating as shown in FIG. 2E. Therefore, after soldering, the signal connection area 24 formed on the lower electrode plate 20 is used to actuate. Because the upper mirror plate 10 is also externally actuated via the lower electrode plate 20, the problem of uneasy actuation of the metallic coating 111 of the mirror 11 on the upper mirror plate 10 is solved.

Figure 3F:
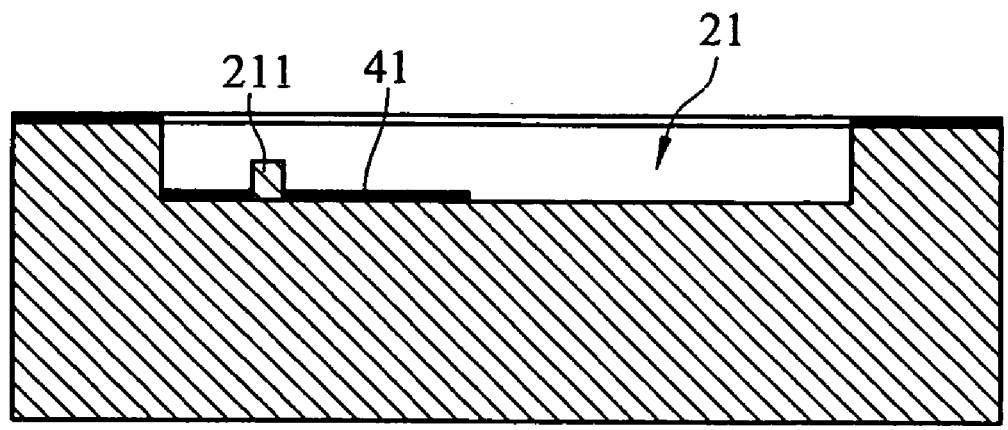
FIGS. 3F and 3G are sequential process views of a second embodiment in making a lower electrode plate of the invention.
Figure 3G:
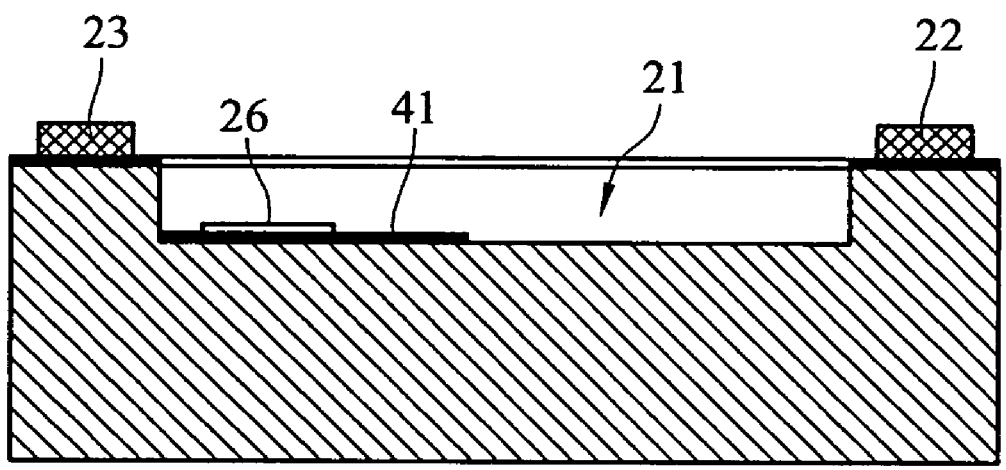

However, since both sides of the mirror 11 have metallic coating 111, 112 as shown in FIG. 4C, when revolving the mirror 11, electrical short by contact of the mirror 11 to the cavity 21 has to be prevented. Therefore, there is at least an insulation stud 211 (as shown in FIG. 3F) or insulation layer 26 (as shown in FIG. 3G) formed on bottom of the cavity 21 for preventing electrical short. It is preferable to have a plurality of insulation studs at a same side, for example, as shown in FIG. 1A, three insulation studs 211, 212, 213 are formed. Of course, an array of studs (not shown in the drawing) can be used.

Figure 5A:
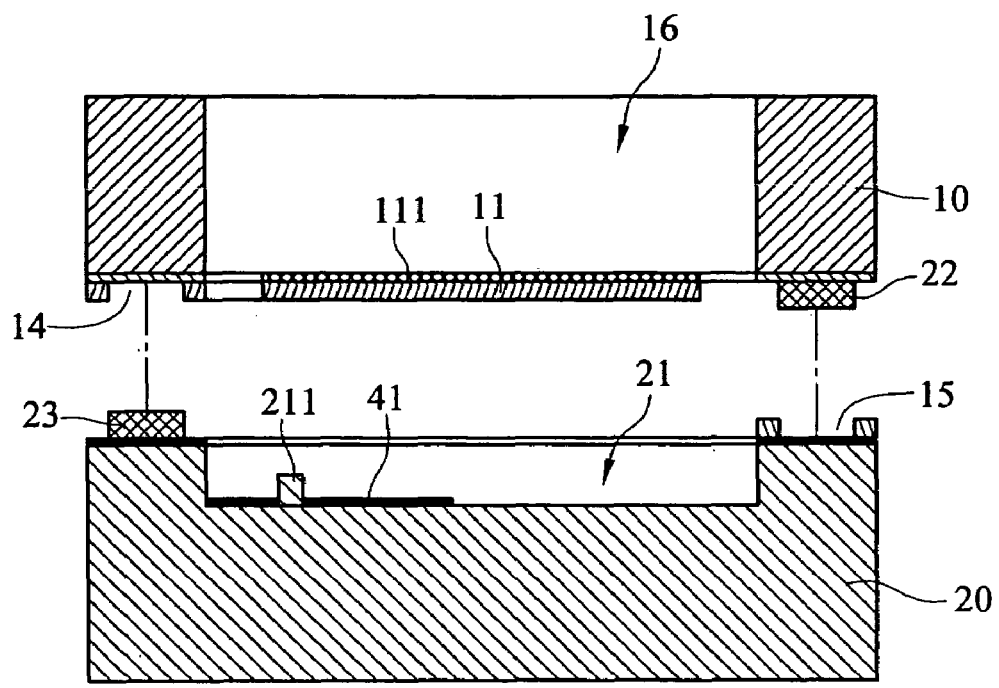
FIGS. 5A and 5B are functional views of the fitting solder and the positioning grove in the invention.
Figure 5B:
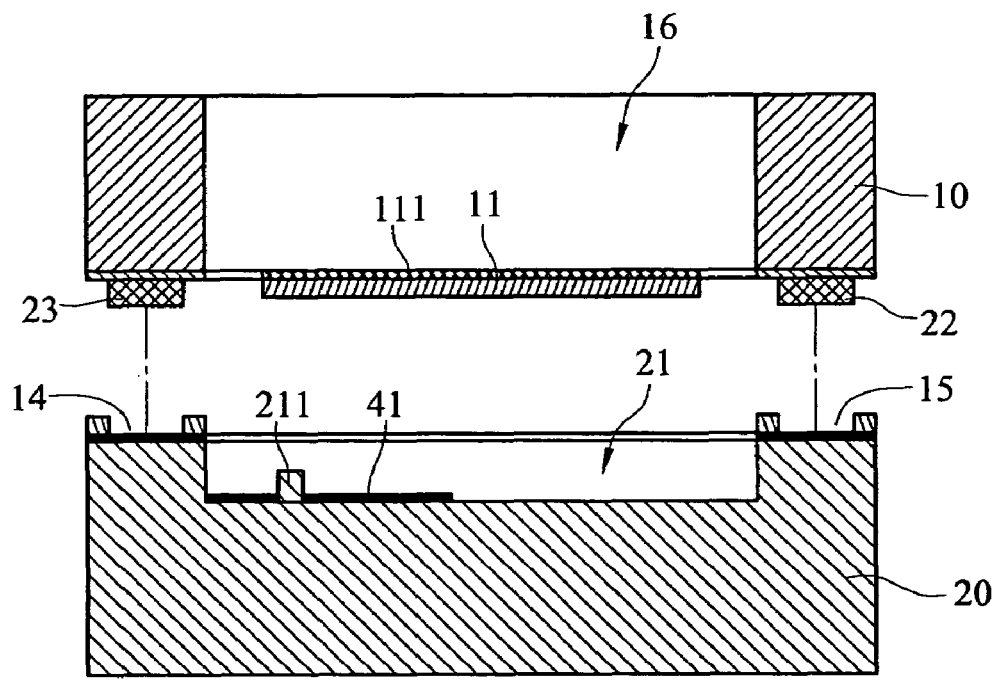

Since the aforesaid positioning grooves 14, 15 and fitting solder 22, 23 are used for positioning and jointing; their positions can be flexibly adjusted. For example, arranging a positioning groove 15 on the lower electrode plate 20 and arranging the fitting solder 22 on the upper mirror plate 10 (as shown in FIG. 5A); arranging both positioning grooves 14, 15 on the lower electrode plate 20 and arranging the fitting solder 22, 23 on the upper mirror plate 10 (as shown in FIG. 5B), or any other number and shape of the positioning grooves and fitting solder can be arranged to get the same effect. Further, the fitting solder can be an electrically conductive resin.

Figure 6:
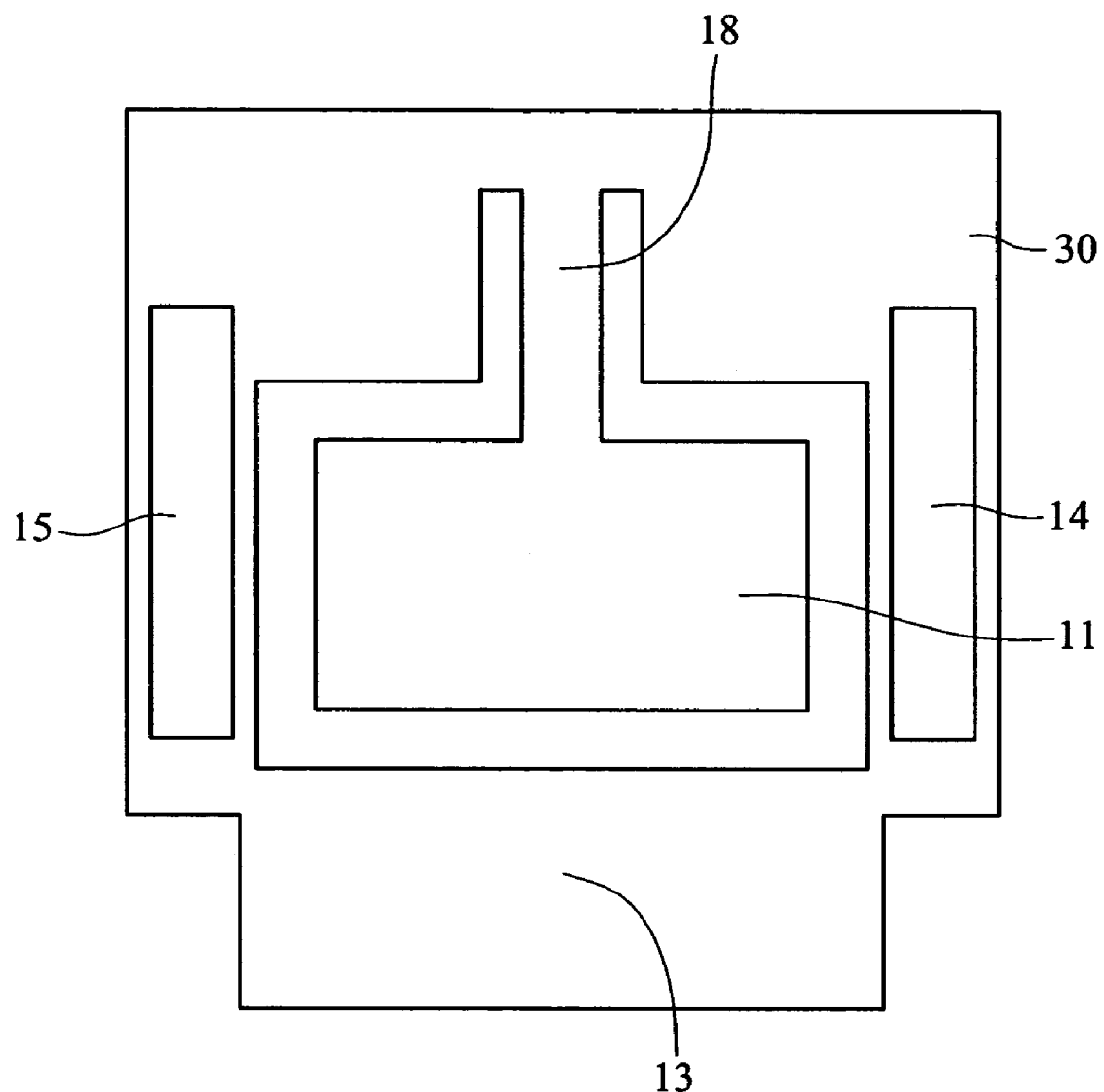
FIG. 6 is a descriptive view of another embodiment of the invention.
Figure 7A:
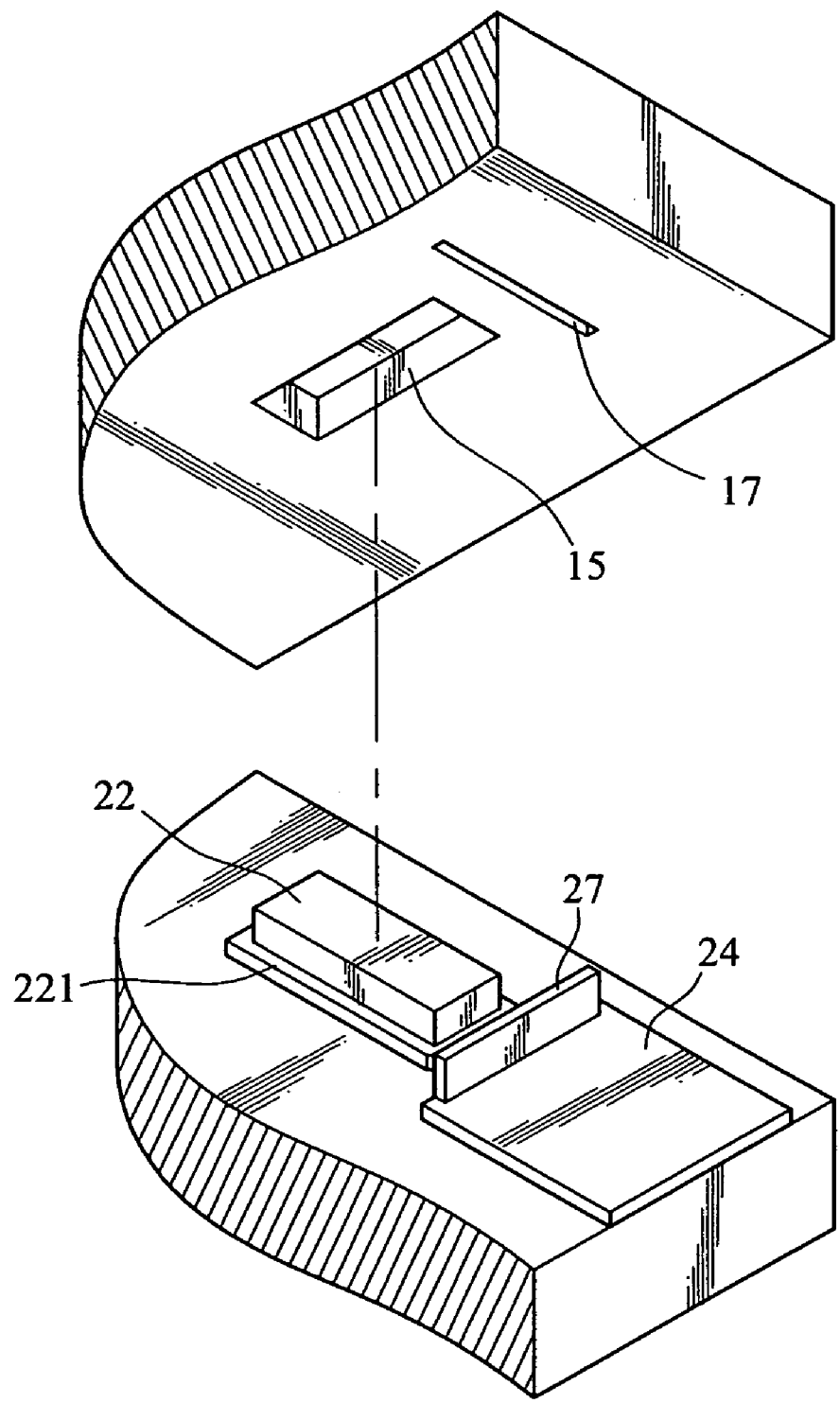
FIGS. 7A, 7B are descriptive views of protection for signal connection area in the invention.
Figure 7B:
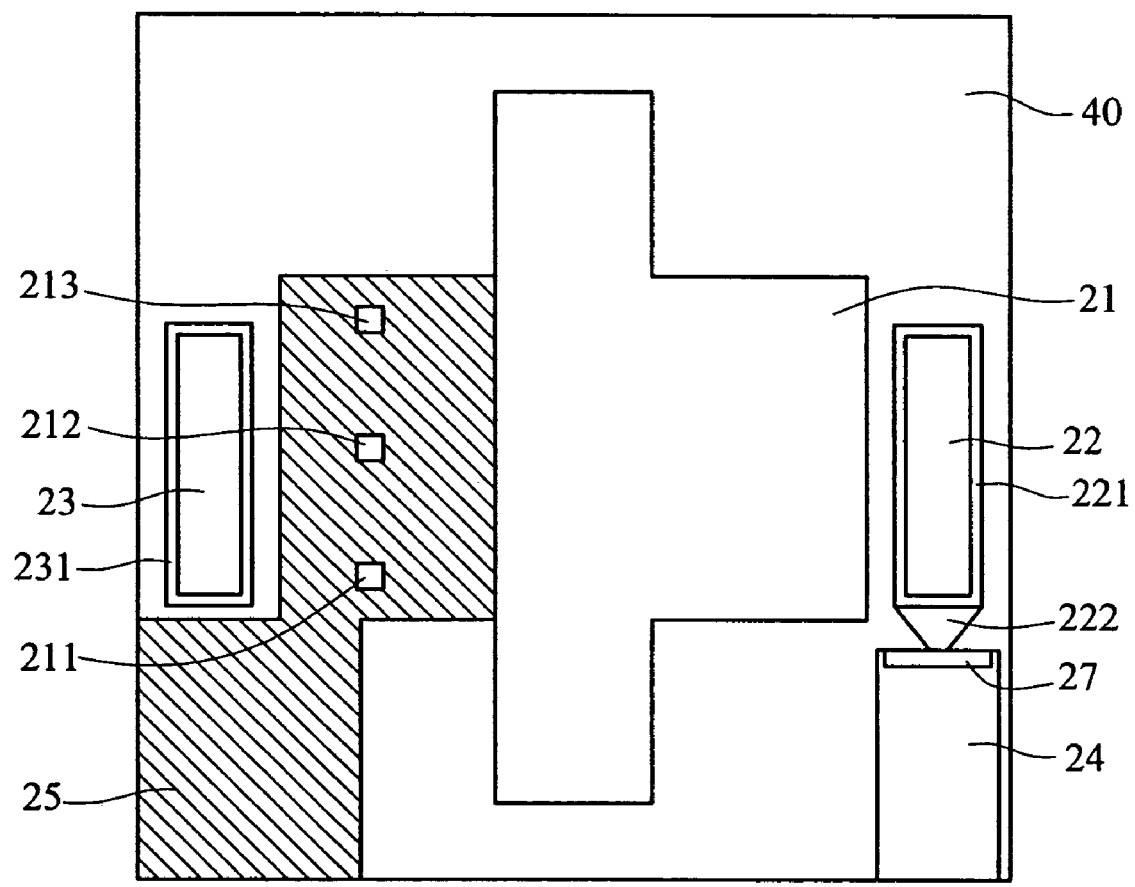

The invention is not only applicable to revolvable mirror with two arms 12, 13, as shown in FIG. 1A, but also applicable to swinging mirror with a cantilever 18 as shown in FIG. 6. On the other hand, the methods of prevention of solder stain from the fitting solder 22, 23 to the signal connection area 24, 25 are shown in FIGS. 7A and 7B. The fitting solder 23 at the left side is located on a different level to the signal connection area 25 so that it is only required to keep the seed layer 231 of the solder 23 a suitable distance from the signal connection area 25. The fitting solder 22 at the right side connects to the signal connection area 24 via a shrinking pipe 222. A stopping wall 27 is further formed between them. The stopping wall 27 is made of material not adhesive to the solder. The shrinking pipe 222, in accompany with the stopping wall 27, restrains the flow of melted solder for preventing it from flowing into the signal connection area 24. A correspondent groove 17 is formed for receiving and positioning the stopping wall 27.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrostatic movable micro mirror chip, comprising:
    an upper mirror plate, having a bottom surface, a top surface and a mirror having reflective coating at the same direction with said top surface, and connecting to said upper mirror plate via at least an arm;
    a lower electrode plate, having a top surface connecting to said upper mirror plate; a cavity formed on said top surface for receiving said mirror movable therein; said cavity is arranged with electrode;
    a plurality of positioning grooves formed on one of said upper mirror plate and said lower electrode plate; and
    a plurality of fitting solder, corresponding to said positioning grooves, formed on the other one of said upper mirror plate and said lower electrode plate;
    via said positioning grooves and fitting solder, said upper mirror plate and said lower electrode plate are positioned and jointed by said solder melted and fixed in said positioning grooves.

2. The electrostatic movable micro mirror chip according to claim 1 wherein said mirror is supported by two arms for revolution upon electrostatic actuation.

3. The electrostatic movable micro mirror chip according to claim 1 wherein said mirror is supported by an arm for swinging upon electrostatic actuation.

4. The electrostatic movable micro mirror chip according to claim 1 wherein said positioning grooves are formed on said bottom surface of said upper mirror plate and adjacent to said mirror.

5. The electrostatic movable micro mirror chip according to claim 4 wherein said fitting solder are formed on said lower mirror plate corresponding to said positioning grooves and adjacent to said cavity.

6. The electrostatic movable micro mirror chip according to claim 1 wherein said fitting solder are formed on said bottom surface of said upper mirror plate and adjacent to said mirror.

7. The electrostatic movable micro mirror chip according to claim 6 wherein said positioning grooves are formed on said lower mirror plate corresponding to said fitting solder and adjacent to said cavity.

8. The electrostatic movable micro mirror chip according to claim 1 wherein said cavity of said lower electrode plate comprises a part of insulation layer to prevent said mirror from contacting said cavity during movement.

9. The electrostatic movable micro mirror chip according to claim 1 wherein said cavity of said lower electrode plate comprises at least an insulation stud to prevent said mirror from contacting said cavity during movement.

10. The electrostatic movable micro mirror chip according to claim 1 wherein root of said fitting solder comprises a solder seed layer having an area a little bit larger than said fitting solder.

11. The electrostatic movable micro mirror chip according to claim 1 wherein said fitting solder connects to a signal connection area via a shrinking pipe; said signal connection area exposes outward after said upper mirror plate and said lower electrode plate being jointed.

12. The electrostatic movable micro mirror chip according to claim 1 wherein said fitting solder connects to a signal connection area; a vertical stopping wall shields between said fitting solder and said signal connection area; said signal connection area exposes outward after said upper mirror plate and said lower electrode plate being jointed.

13. The electrostatic movable micro mirror chip according to claim 1 wherein both sides of said mirror are plated with metallic coating.

14. The electrostatic movable micro mirror chip according to claim 13 wherein said metallic coating is made of material selected from the group consisting of gold, silver, titanium, chromium and aluminum, tungsten, platinum, nickel.

15. The electrostatic movable micro mirror chip according to claim 13 wherein said fitting solder is of lower melting temperature.

16. The electrostatic movable micro mirror chip according to claim 13 wherein said fitting solder is an electrically conductive resin.

* * * * *